Jan. 24, 1939.  B. C. PLACE  2,144,895
TOGGLE BOLT
Filed Jan. 4, 1937
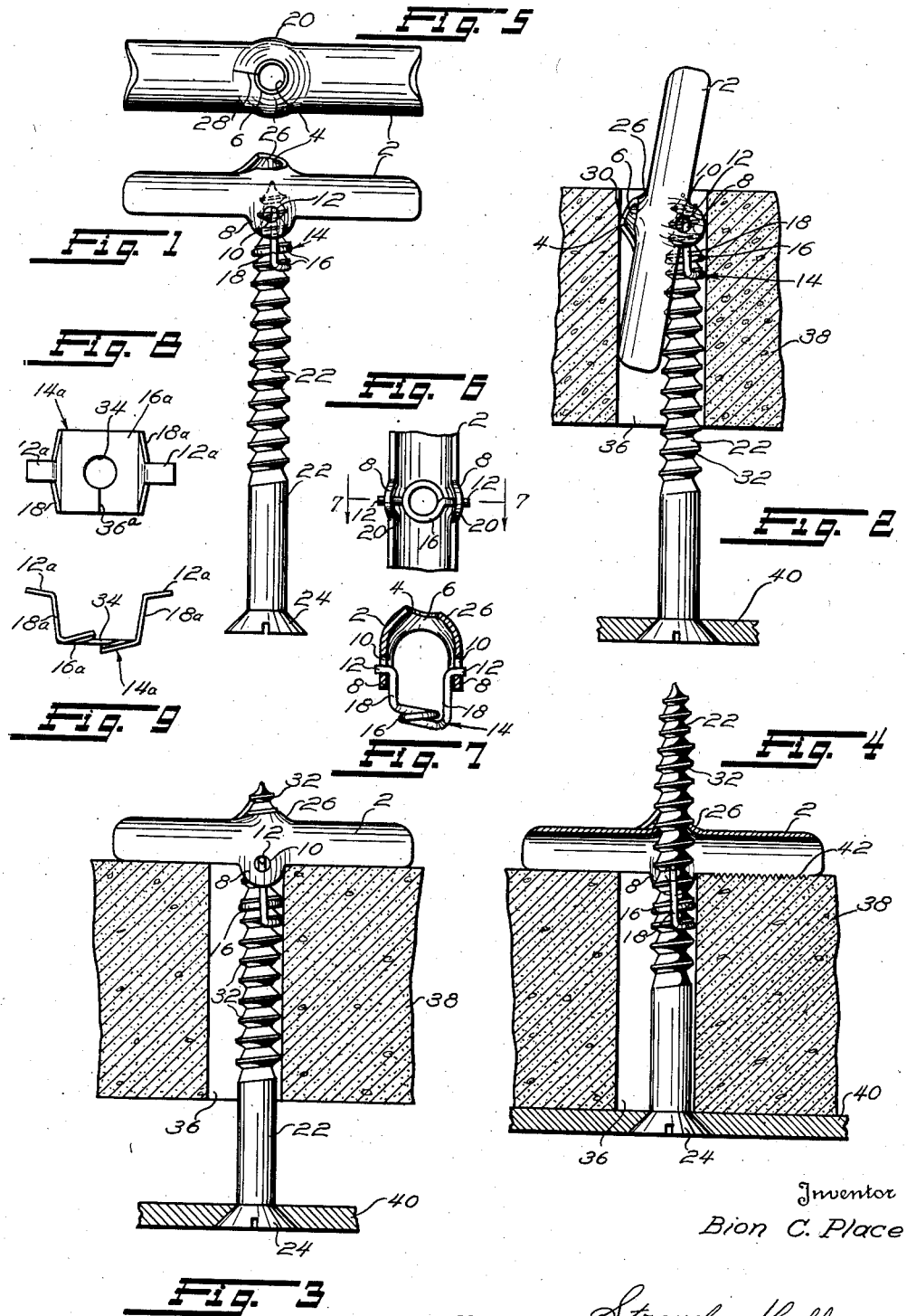
Inventor
Bion C. Place
By Strauch & Hoffman
Attorneys Patented Jan. 24, 1939

2,144,895

UNITED STATES PATENT OFFICE 2,144,895

TOGGLE BOLT

Bion C. Place, Detroit, Mich.

Application January 4, 1937, Serial No. 119,017

11 Claims. (Cl. 85—3)

This invention relates to screw-threaded fastening means and more particularly to that type of fastening means which is commonly known as a "toggle-bolt".

As is well understood "toggle-bolts" are used to secure various elements to masonry or hollow tile walls or to other objects which, due either to the thinness of the walls thereof or the inherent character of said walls, do not provide a suitable anchorage for a threaded member, such as a screw or bolt, and where, because of the nature of the object, it is impossible to apply the usual nut, or equivalent device, to the threaded end of the securing means. An example of this type of object is the conventional hollow tile partition or wall widely used in present day building construction. Walls of this type are usually coated with a layer of plaster and neither the latter nor the wall of the hollow tile are of such a nature as to receive or retain the threaded portion of a screw or bolt. Also, the interior thereof is, of course, inaccessible after the wall is built, and the usual nut cannot be applied to the threaded securing means.

Therefore, it has been proposed to attach a pivoted member or toggle to a threaded element adapted to receive the screw or bolt. With the screw or bolt engaged with this element the pivoted member is swung into a generally side-by-side relation with the screw. This assembly is passed through a hole drilled in the wall and then by suitable manipulation the pivoted member is caused to swing away from its initial position and assume a position more or less at right angles to the screw and parallel to the inside surface of the wall. By tightening up on the threaded member or screw the pivoted member or "toggle" is drawn into firm engagement with the inside of the wall and a more or less secure anchorage is provided. The toggle is, of course, provided with a clearance hold through which the screw projects when the elements are in right angled relation and when the screw is tightened.

Due to the difficulty encountered in manipulating the pivoted member to cause it to assume the desired position, after insertion through the wall, it has also been proposed to provide the aforementioned threaded elements with folding, spring actuated wings, which, when the threaded element is placed on the end of the screw or bolt may be collapsed into side-by-side relation to the latter and in this position inserted through the hole in the wall. On passing therethrough these wings are forced outwardly by said spring and conjointly form a toggle which, upon turning-up of the screw, is drawn into engagement with the wall.

Devices of this type, however, are not entirely satisfactory and this is principally due to the inherent weakness of the small lugs or projections generally used to secure the pivoted threaded element to the toggle and which sustain all of the stress occasioned by tightening of the screw or bolt. Also toggle-bolt assemblies involving spring actuated wings are generally of relatively complicated construction rendering the same not only expensive to produce but likewise unreliable in operation. Furthermore, prior devices, especially of the latter type, are usually large and cumbersome, therefore requiring the drilling of a rather large hole, with the consequent added labor and further weakening of the wall structure.

It is, therefore, a principal object of my invention to provide an improved toggle-bolt assembly, or toggle for use in such an assembly, which is composed of a minimum number of parts, simple to produce and easy to assemble, but which at the same time is dependable and positive in operation.

A further object of my invention is to provide a novel toggle-bolt assembly which, due to the provision of a threaded portion in the body of the toggle element or cross-bar, is unusually strong and not likely to fail in service.

Another object of my invention is to provide a novel toggle-bolt assembly which is not likely to become loosened in service, even though subjected to severe vibrations and working stresses, because of the provision of threads of the self-locking type in the body of the toggle element. Loosening is also guarded against by suitably designing the wall engaging surfaces of the toggle element so as to bite into said wall.

A still further object of my invention is to provide a toggle-bolt assembly which is very compact in structure and which, when folded for insertion through a hole in a wall or other object, is of minimum diameter and therefore requires only a relatively small clearance aperture for installation. In this manner undue weakening of the wall or other supporting structure is obviated and the amount of labor involved is reduced.

Another object of my invention is to provide a novel toggle-bolt assembly which is easy to install since the toggle element is at all times resiliently urged to assume a position at right angles to the screw or bolt with which it is associated and thus automatically assumes the desired operative position after insertion through the wall, or other supporting structure, and which at the same time is of simple design and composed of a few parts so correlated and arranged that absolute dependability of operation is assured while the size of the assembly is not increased.

These and other objects will become apparent from a study of the following detailed description of a preferred embodiment of my invention and the appended claims taken in conjunction with the accompanying drawing wherein:

Figure 1 is a side elevation of my improved toggle-bolt assembly.

Figure 2 is a view showing the assembly in the position it assumes during insertion through a wall or other supporting structure.

Figure 3 is a view similar to that of Figure 2 but with the toggle-element in engagement with the inside face of the wall and with the screw or bolt in a position to be threaded into the toggle-element.

Figure 4 shows the assembly installed with the screw or bolt tightened and with the toggle-element in section.

Figure 5 is a top view of the toggle-element.

Figure 6 is a bottom view of a portion of the toggle-element.

Figure 7 is a sectional view taken on the line 7—7 of Figure 6 looking in the direction of the arrows.

Figure 8 is a plan view of a modified screw receiving pivot element.

Figure 9 is a side elevation of the pivot element shown in Figure 8.

With continued reference to the drawing wherein like reference numerals are used to designate like parts wherever they appear in the several views and with particular reference to Figures 1, 5, 6, and 7, my improved toggle-bolt assembly comprises a cross-bar or toggle 2 which is generally channel-shaped in cross-section and is provided midway of its ends with an opening 4, the wall of which is shaped to provide a screw thread 6. Ears 8—8 are formed on the side-walls of the toggle 2 and are apertured at 10—10. The axis of these apertures 10—10 extends transversely of the toggle or cross-bar 2 and intersects a line drawn perpendicularly to the toggle and through the center of the opening 4. Mounted in these apertures are trunnions 12—12 of a pivotal element 14.

The pivotal element 14 is formed of a piece of spring wire looped at 16 to provide a helical portion adapted to threadably receive a screw or bolt and from which extend resilient arm sections 18—18 carrying the trunnions 12—12 aforementioned. As will be seen in Figures 6 and 7 the ears 8—8 and the adjacent parts of the channel member forming the toggle are bowed outwardly from the centers of the apertures to form the curved surfaces 20—20, see Figure 6. The pivoted element 14 is of such a size that when assembled with the trunnions 12—12 the resilient sections 18—18 are slightly stressed. With the pivoted element 14 in the position shown in Figures 1, 6 and 7, this stress is of minimum value. However, if the element 14 is swung towards a position with the axis of the looped portion 16 parallel to the longitudinal axis of the toggle element 2, this stress is increased. This stress is occasioned by the action of the surfaces 20—20 on the resilient arms 18—18 and moves these arms towards each other. Therefore, when the force tending to hold the pivoted element in the aforementioned parallel position is removed, the arms 18—18, due to their resilient nature, tend to separate and in so doing slide over the surfaces 20—20 to the point where these surfaces are spaced the greatest amount. This point is reached when the axis of the looped portion 16 is at right angles to the longitudinal axis of the toggle 2. Thus the pivoted element 14 at all times is urged to this latter position.

Threadably received by the looped portion 16 of the element 14 is a screw or bolt element 22 having a head 24 and although a common wood screw is here shown it will be understood that any other type of threaded element may be used. With the screw thus assembled on the toggle the parts will assume the position shown in Figure 1, and it will be noted that in this position the axis of the screw or bolt 22 is in alignment with the opening 4. Thus by turning the screw 22 in the proper direction it will enter into the opening 4 and threadably engage the screw thread formed by the walls 6 thereof.

As previously mentioned the walls of the opening 4 are shaped to provide a screw thread. This thread may take any desired form but it is preferably constructed as follows so as to have a self-locking action on a screw or bolt engaged therewith. A portion of the metal of the element 2 is drawn out to form a frusto-conical protuberance 26 with the hole 4 in the center thereof. This protuberance is split along line 28, see Figure 5, and the side wall 6 of hole 4 is shaped to present a helical surface 30. This helical surface is similar in pitch to the screw element which is to be received thereby and forms, in effect, a single convolution of a spiral thread. The sheet metal which forms the element 2 is relatively thin and is of a thickness less than the space between the threads of the screw or bolt 22. Thus when the latter is threaded into the hole 4 the helical surface 30 of the wall 6 bears on the side walls of the threads 32 and when the screw is tightened the conical protuberance tends to flatten and wedges the helical surface 30 into firm and locking engagement with these threads. This type of means for adapting sheet metal elements for the reception of threads is more particularly described, and also is claimed, in my copending application Serial No. 87,292, filed June 25, 1936.

While the above described thread means is preferably used in my toggle element it is to be understood that any other type of self-locking thread may be provided and also, where a self-locking thread is not desired, the hole 4 in the element 2 may be simply drilled and tapped in a conventional manner. However, where the screw or bolt 22 is provided with threads of the type shown, which are spaced at a distance greater than the wall thickness of the element 2, the herein disclosed type of thread is preferably used.

It is also noted that the ears 8—8 may, in some cases, be dispensed with and the apertures 10—10 located further down in the side-walls of the channel member 2. In this case the curved surfaces 20—20 are, of course, formed entirely in said side-walls in a manner which will be obvious.

Figures 8 and 9 show a modified type of pivoted element 14a which is formed of a piece of suitably shaped spring metal. A body portion 16a is provided with parallel resilient arms 18a which carry, on their outer extremities, trunnions 12a—12a, corresponding to the trunnions 12—12 of the element 14. The body 16a is provided with an opening 34 and is split at 36a. The wall of body 16a is bent, adjacent to the opening 34 so that the wall of said opening assumes a shape, see Figure 9, corresponding to one convolution of a helix having a pitch equivalent to that of the screw or bolt which is to be used therewith. The diameter of the opening 34 is just slightly larger than the root diameter of the said screw or bolt. In use the trunnions 12a—12a are sprung into the openings 10—10 and the arms 18a—18a resiliently engage the curved surfaces 20—20 of the toggle 2. As will be obvious the coaction of the arms 18a—18a and these curved surfaces tends to hold the element 14a in a position with the axis of opening 34 at right angles to the longitudinal axis of the toggle 2. Thus with the screw or bolt 22 threadably received by the walls of opening 34 and the trunnions 12a—12a fitted in the openings 10—10, the toggle element 2 is caused to assume the position shown in Figure 1 but may be swung into a side-by-side position in the manner previously described.

Although the operation of my improved toggle-bolt is no doubt obvious from the foregoing it is briefly as follows:

An opening 36 is first drilled in the object 38, which may be a hollow tile wall or any other hollow object, and this opening is of course made large enough to receive the toggle assembly when the toggle is swung into a side-by-side position with the screw or bolt 22. The screw or bolt is then unthreaded from the pivoted element 14, or 14a, and passed through a hole in the element 40, which it is desired to secure to the object 38. The screw 22 is then threaded into the pivoted element 14 for a short distance and the toggle 2 swung into side-by-side position. In this position the assembly is passed through the opening 36. See Figure 2.

When the toggle has passed through the opening 36 the spring action of the resilient arms in connection with the curved surfaces 20—20 causes the toggle 2 to swing into a right angle position with respect to the screw or bolt 22. The toggle 2 is then held against the inside wall of the object 38 to prevent turning thereof, see Figure 3, and by turning the screw or bolt, the same engages the thread 30 formed by the walls 6 of the opening 4 in the toggle element. Finally the screw or bolt is tightened to the position shown in Figure 4, with the toggle 2 and element 40 held firmly against opposite walls of the object 38. By virtue of the nature of the thread formed by the wall 6 of the opening 4 the screw 22 is held against retrograde turning, as above pointed out, and a very secure fastening is thus accomplished.

It is also desirable, but not necessary, that the edges of the toggle 2 be roughened or knurled, as at 42, Figure 4, to prevent the turning of the same during installation and also to further insure against accidental loosening of the fastening. With the toggle thus held against rotation and the screw locked thereto by the action of the self-locking threads, accidental turning of the screw 22 is positively prevented.

It is noted that due to the channel-shaped form of the toggle 2 the screw 22 lies within the side walls thereof when the assembly is being inserted through the opening 36. Thus this opening may be of minimum size and the labor entailed in forming the same, as well as the attendant damage to the object 38, accordingly reduced.

It is also especially noted that the stresses arising from tightening the bolt or screw 22 are entirely sustained by said bolt and the strong toggle element 2. This very desirable result is produced by providing the thread forming opening 4 in the body of the toggle 2. By thus removing the load from the relatively small trunnions 12—12, or 12a—12a the overall strength of the device is materially enhanced.

Although I have shown my improved toggle-bolt assembly used in connection with a masonry or hollow tile wall it will be, of course, understood that it is by no means limited to such use but is adaptable for use in connection with other objects and in other locations where a toggle-bolt is necessary or desirable. Another example is in the assembly of metal furniture where certain elements must be secured to hollow metal members and where the walls of these members are too thin to take a thread and where the inside thereof is inaccessible, making the use of a nut impossible.

It is also possible to dispense with the spring action of the arms 18—18, or 18a—18a, and the curved surfaces 20—20, if desired, and rely on manual manipulation of the screw element to bring the toggle 2 into right angled position after insertion through the hole 36. In this event the arms 18—18 or 18a—18a are loosely received between the side walls of the channel-shaped toggle 2, with the trunnions 12—12 or 12a—12a journalled in the holes 10—10 so that the toggle 2 can swing freely thereon. If desired one side of the toggle may be made longer and/or heavier than the other to assist in bringing the same into right angled position by the aforementioned manual manipulation thereof.

Thus it is seen that I have produced a novel toggle-bolt assembly which is composed of few parts and is easy and inexpensive to manufacture, but at the same time is very readily installed through an opening of minimum size, is dependable in operation and provides a fastening means of unusual strength. Also the nature of the threaded connection is such as to preclude accidental loosening of the screw or bolt.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A toggle-bolt comprising a threaded member, a sheet metal channel-like cross-bar linked to said member so that said bar may be disposed in side-by-side relation to said member or at right angles thereto, said cross-bar being provided with a split conical protuberance having an opening therethrough, the wall of said opening being shaped to provide a self-locking thread engaging said member when the latter is threaded through said opening and drawn into tight engagement with said wall.

2. A toggle-bolt comprising a threaded member and a sheet metal channel-like toggle-member, an element threadably associated with said threaded member and pivoted to said toggle member, said toggle member being provided with a split conical protuberance having an opening therein shaped to form a self-locking thread, the pivotal axis of said element being located so that said toggle member may be disposed at right angles to said threaded member with said opening in alignment with said threaded member, whereby said threaded member may be threaded into locking engagement with said self-locking thread.

3. A toggle-bolt comprising a threaded member and a toggle member, means pivoted to said toggle member and threaded to said threaded member so that said members may be disposed in side-by-side relationship or at right angles to each other, said means including resilient portions and said toggle member being provided with curved surfaces engaging said resilient portions, said curved surfaces being shaped to distort said resilient portions when said members are in other than right angular relation whereby said members are at all times resiliently urged towards said last named position.

4. A toggle-bolt comprising a threaded member and a toggle member, an element pivoted to said toggle-member and provided with a threaded opening receiving said threaded member whereby said members may be disposed in side-by-side relation or at right angles to each other, said toggle-member being provided with opposed curved surfaces adjacent to said element and said element having resilient arms engaging said surfaces, said curved surfaces being shaped so that movement of said members towards said side-by-side relation is resiliently resisted by said arms and said members are normally urged to right angular position.

5. In a toggle-bolt assembly as set forth in claim 4 wherein said pivoted element is formed of a U-shaped wire spring having spaced resilient arm portions joined by a looped portion providing said threaded opening.

6. A toggle for use in a toggle-bolt assembly comprising an elongated member and an element pivoted thereto, said elongated member being provided with a threaded opening, said pivoted element being adapted to threadably receive a threaded element, and resilient means associated with said pivoted element and cooperating with cam surfaces on said elongated member, said resilient means tending to urge said pivoted element to assume a position such that a threaded element received thereby will axially align with said threaded opening.

7. A toggle-bolt assembly adapted for use with a supporting structure, comprising a threaded member and a toggle member having a roughened surface pivoted to said threaded member; said toggle member being also provided with an opening having its side-wall shaped to provide a self-locking thread, the pivotal axis of said threaded member and said toggle being arranged so that said member and said toggle may be disposed at right angles to each other with said threaded member in axial alignment with said opening; whereby said threaded member may be threaded into said opening to draw said self-locking thread into locking engagement with said threaded member and said roughened surface into frictional engagement with the supporting structure.

8. A toggle for use in a toggle-bolt assembly comprising an elongated sheet metal channel-like element and a member pivoted thereto, said member being provided with an opening adapted to threadably receive a screw threaded member, and said elongated channel-like element being provided with an opening having walls shaped to provide a self-locking thread, said pivoted member being located so that said openings may be brought into alignment.

9. A toggle for use in a toggle-bolt assembly comprising the combination set forth in claim 6, wherein said elongated member is formed as a channel-like sheet metal element and is provided with an opening having walls shaped to provide a self-locking thread.

10. A toggle-bolt assembly comprising, a threaded member and a sheet metal channel-like toggle member, said toggle member being provided with a split conical protuberance having an opening therein to form a self-locking thread, a U-shaped wire spring element pivoted to said toggle member and having spaced resilient arm portions joined by a looped portion providing a threaded opening receiving said threaded member, whereby said members may be disposed in side-by-side relation with said threaded member nesting in the channel of said toggle member or at right angles to each other with said threaded member aligned with said self-locking thread, said toggle member being provided with opposed curved surfaces arranged to engage said resilient arm portions of said spring element, said surfaces being shaped so that movement of said members towards said side-by-side relation is resiliently resisted by said arms and said members are normally urged to right angular position.

11. A toggle bolt, comprising, a threaded member and a threaded toggle member, means associated with said threaded member for pivoting the latter to said toggle member so that said threaded member and said toggle member may be disposed in side-by-side relation or at right angles to each other, said means being formed of a single piece of wire, including a looped portion for engaging the threaded member and having extensions providing spaced resilient arms cooperating with portions of said toggle member to urge said members into said last-named position.

BION C. PLACE.